R. S. Torrey,
Walking Beam for Stone Drills.
No. 60,595. Patented Dec. 18, 1866.
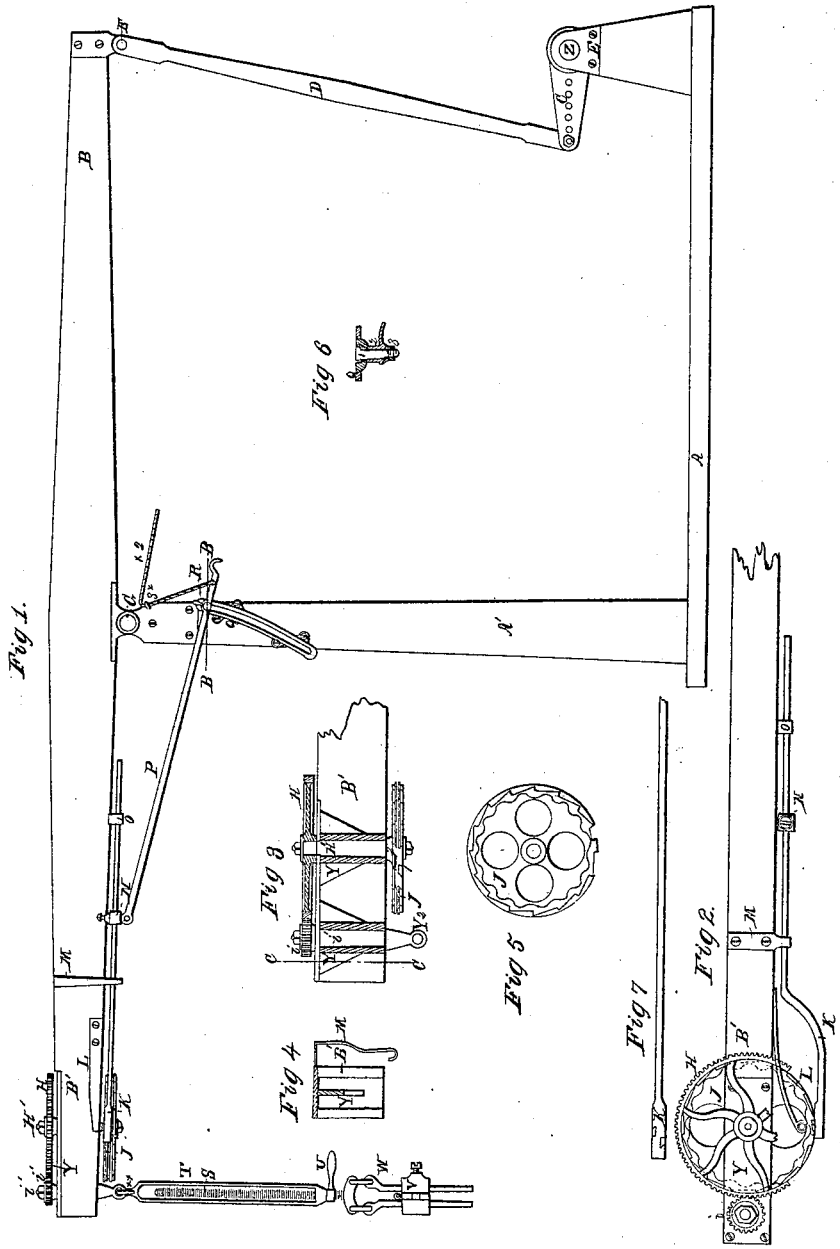
Witnesses.
Inventor.
R. S. Torrey

United States Patent Office.

IMPROVEMENT IN DRILLS FOR ROCKS, WELLS, &c.

R. S. TORREY, OF BANGOR, MAINE.

Letters Patent No. 60,595, dated December 18, 1866.

The Schedule referred to in these Letters Patent and making part of the same.

TO ALL WHOM IT MAY CONCERN:

Be it known that I, R. S. TORREY, of the city of Bangor, and State of Maine, have invented a new and improved apparatus for turning a Drill; and I do hereby declare that the following is a full, clear, and exact description of the same, reference being had to the accompanying drawings, making part of this specification.

Figure 1 is a side elevation of machine.

Figure 2 is a plan of said machine.

Figure 3 is a longitudinal section of frame.

Figure 4 is a cross-section at the line $c\ c$, fig. 3.

Figure 5 is a plan of reversible ratchet.

Figure 6 is a cross-section of circular slotted plate at the line B B, fig. 1.

Figure 7 is a view of dog or hand.

This invention consists in so forming or constructing an improved apparatus for turning a tool for drilling purposes as to render it more easily managed, and with less expense and labor, than attends the use of the ordinary machine. It consists in providing a movable walking-beam, provided with the other attachments necessary for operating the same, with a peculiarly formed self-operating reversible ratchet-wheel, for the purpose of turning the drill a desired number of turns in one way, and then of turning the drill the desired number of turns in the opposite direction, with a dog or hand for turning the said ratchet-wheel, and with a circular curved plate, which shall render the machine more certain and effective in action.

To enable others skilled in the art to make and use my invention, I will proceed to describe its construction and operation.

To the longitudinal base A, fig. 1, are secured the usual pillar blocks F, with driving shaft Z, crank C, and other attachments for giving motion to the walking-beam B B', from shaft Z, by means of pitman D; one end of which is attached by a wrist-pin to crank C, which is perforated with holes, to give any desired throw to walking-beam B B'; while the opposite end is jointed to the walking-beam at E, which in turn is jointed to the centre-post at G, secured to longitudinal base A'. The opposite end of walking-beam, B', is provided with a suitable frame Y, fig. 3, to hold the shaft H', to the upper end of which is secured gear H, figs. 1, 2, 3, of suitable size, and on the other end is a double ratchet-wheel, J, figs. 1, 2, 3, and 5, having teeth upon each side, so arranged as to reverse the action of dog or hand K, figs. 1, 2, and 7. Said dog is held in its place by means of a spring M, fig. 1. The said ratchet-wheel J, figs. 1, 2, 3, and 5, is held in proper position by friction roller and spring L, figs. 1 and 2, and is reversed at every fifteenth stroke of the walking-beam B B', fig. 1. Said dog or hand K, figs. 1, 2, and 7, is supported by means of one or more guides, O, fig. 1, attached to walking-beam B'. The dog or hand presses against the ratchet J, fig. 1. The backward and forward motion of the dog K, figs. 1, 2, and 7, is communicated by means of an adjustable connecting-rod, P, fig. 1, so arranged to dog at one end by knuckle-joint N, figs. 1 and 2, as to enable one to adjust it. The opposite end of connecting-rod P, fig. 1, is secured by a nut-sleeve and bolt, attached to curved plate Q, figs. 1 and 6, on centre-post A', fig 1. The slotted curved plate Q, fig. 1, is so constructed as to regulate the throw of the dog or hand K, figs. 1, 2, and 7. By moving the nut 3, stud 1, sleeve 2, fig. 6, up or down, when the throw of the crank is altered from one hole to the other, moving the ratchet J, figs. 1, 3, and 5, one notch at a time. The shaft $i'$, fig. 3, is driven by gear H, figs. 1, 2, and 3, by means of pinion $i$, figs. 1, 3, and 7, one-fourth the size of the gear H, figs. 1, 2, and 3, on one end of shaft $i'$, fig. 3. On the other end of the shaft an eye, $Y^2$, fig. 3, is attached, to which is appended the usual temper bar screw and clamps, W V S T, and jam nut, U, fig. 1.

Operation.

In order to illustrate the manner in which the several described parts operate, we will suppose the machine to be in regular operation, with crank C, fig. 1, extended to its highest point. Now, as crank C, fig. 1, passes round to its lowest point, the extreme end of walking-beam B', fig. 1, is at its highest point. The dog or hand K, being moved by a connecting-rod, P, fig. 1, secured to the circular curved plate Q, causes it to move backward and forward by the motion of the walking-beam B'; therefore it draws the ratchet-wheel J, figs. 1, 5, and 7, one tooth, turning gear H one-sixteenth way round, which turns temper bar T one-fourth way round while this end of walking-beam B' is descending. A spring L, with a roller attached, drops in the inside rim of ratchet J, and holds it secure until dog K takes another tooth. In this manner it continues until it has gone fifteen-sixteenths way round, when the guides 2 2, fig. 3, shift it to the other side of ratchet J, by which motion is reversed, and ratchet J turns the other way. In this way it continues backward and foward, alternately. An arrangement is provided by which, in case the temper bar T, fig. 1, is not required to turn the connecting-rod P, fig. 1, it may be disconnected by a pulley for that purpose.

What I claim as new, and desire to secure by Letters Patent, is—

1. I claim the self-operating reversible ratchet J, so constructed that it will reverse its motion with the same stroke, and will give the desired motion to the drill at every vibration of walking-beam B, for drilling purposes, in combination with friction roller and spring L.

2. I claim the dog or hand K, connecting P, figs. 1, 2, and 7, adjustable slide N, figs. 1 and 2, nut 3, sleeve 2, fig. 6, which is attached to centre-post A, fig. 1, in combination with the circular slanted plate for regulating the stroke of dog or hand K, fig. 1, to each stroke of walking-beam B, in the manner and for the purpose substantially as described.

3. I claim the reversible shafts H and H', fig. 3, in combination with gear H and pinion $i$, figs. 1, 2, and 3, the whole operating in the manner and for the purpose set forth.

R. S. TORREY.

Witnesses:
   Z. L. DAVIS,
   P. A. GATCHELL.